United States Patent [19]

Bopp

[11] 4,169,527

[45] Oct. 2, 1979

[54] FRICTION FAN CLUTCH

[75] Inventor: Warren G. Bopp, Farmington, Mich.

[73] Assignee: Eaton Corporation, Cleveland, Ohio

[21] Appl. No.: 823,234

[22] Filed: Aug. 9, 1977

[51] Int. Cl.[2] ........................ F16D 43/25; F16D 13/18

[52] U.S. Cl. ........................ 192/82 T; 192/74

[58] Field of Search ........................ 192/74, 82 T; 123/41.12

[56] References Cited

U.S. PATENT DOCUMENTS

| | | | |
|---|---|---|---|
| 2,740,388 | 4/1956 | Bennorth | 192/82 T |
| 2,847,095 | 8/1958 | Sohlberg et al. | 192/82 T |
| 2,972,398 | 2/1961 | Davis | 192/82 T |
| 3,055,474 | 9/1962 | Ferris et al. | 192/82 T |
| 3,221,721 | 12/1965 | Kuze | 192/82 T X |
| 3,903,712 | 9/1975 | Richter | 192/82 T X |

FOREIGN PATENT DOCUMENTS

| | | | |
|---|---|---|---|
| 163079 | 10/1933 | Switzerland | 192/82 T |

*Primary Examiner*—Allan D. Herrmann

*Attorney, Agent, or Firm*—R. J. McCloskey; D. Wood; J. G. Lewis

[57] ABSTRACT

A temperature responsive clutch has a first arcuate inward facing clutch member, which can be a housing, secured to a rotating shaft. A second arcuate outward facing clutch member is mounted on the shaft radially inward from the first member and rotates independent of the first member. At least a portion of the second clutch member is adapted to move into and out of engagement with the first member. In the engaged position, the first and second members rotate in unison to rotate a fan attached to the second member. A temperature responsive device, such as a wax pill motor, is located so air passes thereover. The temperature responsive device will move a portion of one of said members radially into engagement with the other member when the temperature of the passing air signals that additional cooling is needed.

9 Claims, 4 Drawing Figures

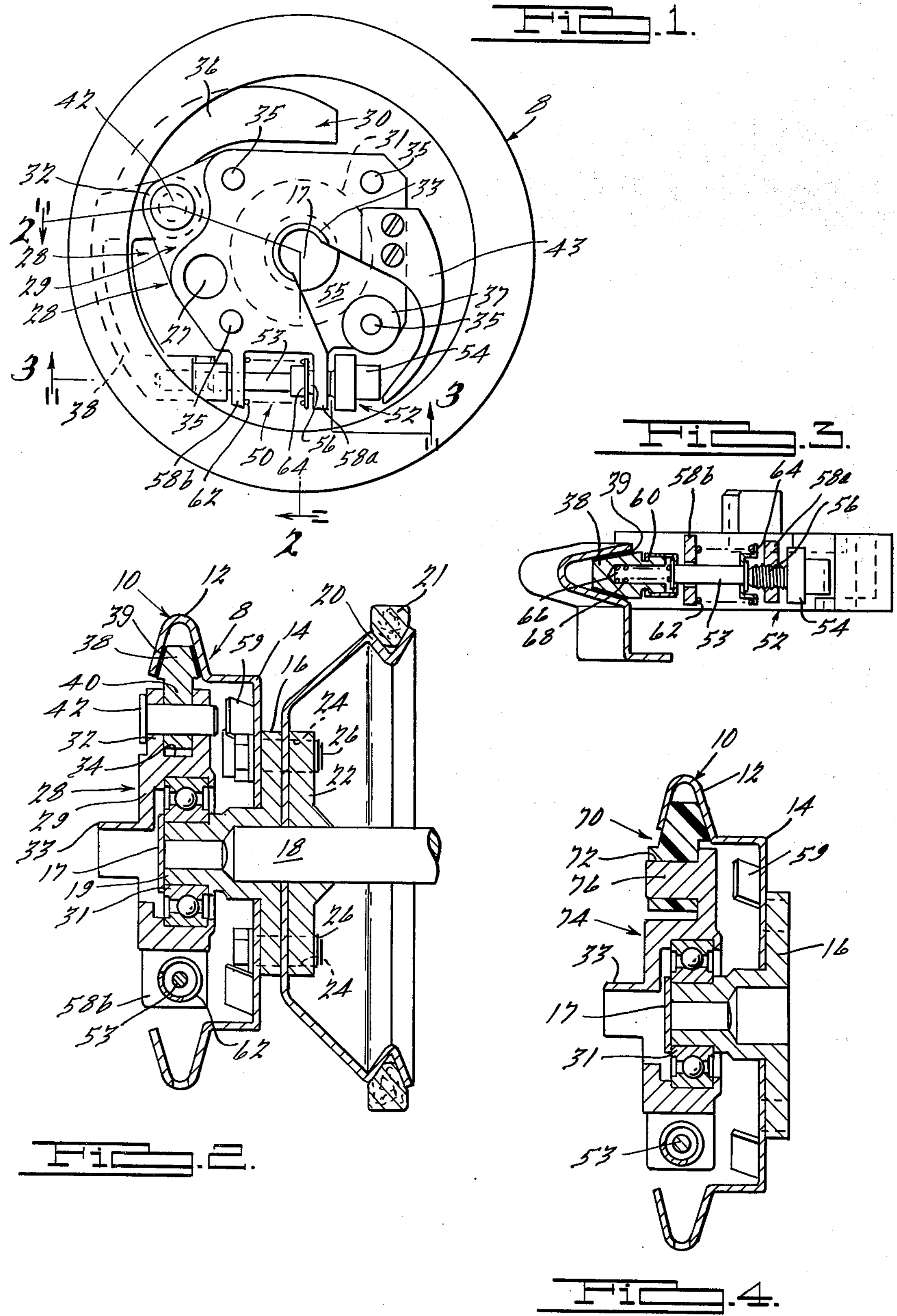

FRICTION FAN CLUTCH

PRIOR ART STATEMENT

The following references are considered to be relevant to the present invention: U.S. Pat. Nos. 2,990,045 Root, 3,103,308 Wolfram.

Root discloses first and second clutching members mounted to allow relative rotation, the first clutching member being driven and the second member carrying a fan. When cooling is needed a thermally responsive element will move the second clutch member longitudinally into engagement with the first member thereby driving the fan.

Wolfram discloses two clutching members which are moved longitudinally into engagement along their longitudinal axis by means of a temperature responsive element.

BACKGROUND OF THE INVENTION

1. Field of the Invention

In one aspect, this invention relates to clutches for internal combustion engine cooling systems.

In a further aspect, this invention relates to fan clutches which are temperature controlled.

2. Description of the Prior Art

Fan clutches have been common in automobiles and trucks for many years. Such clutches rotate the fan and draw power only when the temperature of the air passing through the radiator, common to such vehicles, reaches a predetermined level.

One example of a mechanical fan clutch known in the art is shown in U.S. Pat. No. 2,990,045 issued to Root. The device of this patent comprises a driven member mounted on a waterpump shaft and having a drive surface. A second member carrying a fan is mounted on the shaft the second member being mounted to allow relative rotation between the first and second members. A thermally responsive element is provided which when heated will move the second, fan carrying member longitudinally along the axis of the water pump shaft bringing the two members into engagement.

A further mechanical fan clutch arrangement is shown in U.S. Pat. No. 3,103,308 issued to Wolfram. In this device two clutch members adapted to rotate independently are moved longitudinally into engagement along the longitudinal axis of a mounting shaft by the action of a temperature responsive wax motor.

The prior art clutches are basically cone clutches which slip when the clutch is not firmly engaged causing substantial wear. Further, the wax pill motors used heat slowly causing a slow clutch engagement and disengagement which causes further wear on the clutch as the clutch slips during engagement and disengagement. Slipping clutches have a short life, low torque transmission and slow engagement.

SUMMARY OF THE INVENTION

It is an object of this invention to provide a long lived, fast acting, high torque mechanical fan clutch suitable for mounting on an internal combustion engine.

As a feature of this invention, a clutch member includes a first rotating clutch member secured to a shaft, a second clutch member coaxially mounted for rotation relative to the first member and a temperature responsive means which selectively radially moves a friction clutching surface to positively engage or disengage the clutch. As the second clutch member contacts the rotating first member the drag forces acting on the second member pull the second member into engagement locking the clutch thereby providing for rapid engagement and minimal wear.

As a further feature of this invention, the second clutch member comprises a fan carrier coaxially mounted on the shaft and a pivotable engaging member, mounted on the periphery of the fan carrier, the engaging member being pivotable between engaged and disengaged positions. In this configuration the pivotable member is rapidly pulled into engagement with minimal slippage because the clutch is self-energizing.

BRIEF DESCRIPTION OF THE DRAWINGS

In the accompanying drawings:

FIG. 1 is a front elevation of a fan clutch of this invention;

FIG. 2 is a cross-sectional view through FIG. 1 taken along line 2—2 showing the engaging means in an engaged position;

FIG. 3 is a cross-sectional view taken along line 3—3 of FIG. 1; and FIG. 4 is a cross-sectional view of a second embodiment of the mechanical fan drive of this invention.

DETAILED DESCRIPTION OF THE PREFERRED EMBODIMENTS

Referring initially to FIGS. 1 and 2, a fan clutch 8 having an outer housing 10 is shown having a cup-shaped portion 12 disposed about its periphery and an L-shaped portion 14 which extends from the cup-shaped portion to an annular hub member 16. The annular hub member 16 is mounted on a shaft 18 and has a shaped portion 19 which extends coaxially outward from the shaft.

Rotatable shaft 18 normally is used to drive a water pump and is mounted on an engine (not shown) to be cooled in a manner well known in the cooling system art. A pulley member 20 is disposed between the annular hub 16 and an annular nut plate 22. The housing 10, hub 16, and pulley 20 have a plurality of apertures which can be aligned with complementary threaded apertures 24 in the annular nut plate 22. A plurality of threaded bolts 26 (shown in FIG. 2) hold the parts together. Pulley 20 is constantly rotated by a belt 21 in a manner well known in the fan art thereby rotating the hub 16 and housing 10.

A fan carrier 28 comprises a disc 29, an engaging member 30, and a fan (not shown) having blades radially disposed about a hub which would be mounted on a fan pilot 33. The fan is omitted in order to more clearly show the clutch member 10 but is mounted to the clutch and secured using threaded bolts which engage a plurality of threaded apertures 35 on the disc 29 in a manner well known in the art. The number and location of fan blades to be attached to the disc can be readily determined by those skilled in the art depending upon the degree of cooling desired. The fan carrier 28 provides access to the bolts 26 via an access port 27.

The fan carrier 28 is press fitted on a ball bearing assembly 31 having an inner and outer race with a plurality of balls therebetween, the assembly being assembled in a well known manner, and rotates at a rate independent of the shaft 18. The bearing assembly is press fitted onto the shaped portion 19 of hub 16 holding the bearing assembly and disc 29 coaxially aligned. As shown, rivet 17 helps retain the bearing 31 on hub 16.

The disc 29 has a shoulder 32 which projects radially away from the shaft 18, having therein a groove 34. The groove 34 carries a pivotable member 36 with a head 38 and a body 40, the body being mounted within the groove and the head projecting radially outward from said shaft. As shown in FIGS. 2 and 3, the head 38 has a friction surface 39 bonded thereto; the friction surface increases the engaging ability of the head. The pivotable member 36 is rotatably mounted on a pin 42 and can be oscillated about the pin.

The housing normally rotates so that as the pivotable member 36 is pivoted into engagement, the motion of the housing draws the pivoting member 36 into firmer engagement making the clutch self-actuating once the pivoting member is engaged. Because of the self-actuating feature, the head 38 will be rapidly pulled into engagement once it makes contact with the housing. The resulting engagement is quick and accomplished with a minimum of slippage. As shown the housing has steeply angled sides in the form of a "V" to receive the head 38 which has complimentary mating surfaces.

The V-shaped clutching surface acts as a dual radial cone clutch which multiplies the torque transmitting capacity of the clutch. Thus, the clutch of this invention has a high torque capacity for a small energizing force. Also, the shape of the clutching surface allows a high torque to be transmitted without slippage.

The fan carrier 28 is balanced by means of a counterweight 43 shown secured to disc 29 by a pair of machine screws. The counterweight is shaped so as to direct air entering a recess 55 toward the temperature sensing means 52 to increase temperature responsiveness.

A temperature responsive drive means 50 is located so as to act on one end of the pivotable member 36. As shown in FIGS. 1 and 3, the temperature responsive drive means 50 comprises temperature sensing means 52, and a shaft 53 which engages a portion of the pivotable member 36 and can be moved by the temperature sensing means. One example of a suitable temperature sensing means 52 would be a wax filled power element which is well known in the art of thermostatic valves for engine cooling systems. The temperature sensing means 52 has an externally threaded portion engaging an aperture in one of the standards 58 rigidly holding the temperature sensing means in place. The shaft 53 is adapted to move longitudinally through a bushing in response to changes in temperature. The wax in temperature sensing means is selected to have a high coefficient of expansion at its solid to liquid phase change. When the temperature rises the wax changes to a liquid expanding its volume and moving shaft 53. The force on shaft 53 in turn moves the end of the engaging member 30 radially outward and into contact with the housing. When the engaging member 30 firmly engages the housing 10, the housing and the member will turn in unison as long as the wax is liquid and causes a pressure on the shaft 53. The rotation of the disc 29 during engagement causes the fan blades to rotate and draws air into the cooling system of the internal combustion engine.

In operation, air enters the opening in the fan pilot 33 where it encounters the rivet 17 and the bearing assembly 31. The air moves into a recess 55 in disc 29, the recess directing the air around a boss 37 with one of the threaded apertures 35 and around the temperature sensing means 52. This configuration places the temperature sensing means 52 behind the fan, thereby protecting the temperature sensing means from damage during handling of the clutch 8. Air which passes into the housing 10 via the recess 55 moves to the back of the housing and can exit via a plurality of apertures associated with vanes 59. The vanes in combination with the hollow fan carrier 28 allow a free circulation of air through the clutch for good temperature sensing. In fact, the vanes 59 act to pump air through the clutch thereby promoting air flow.

The temperature responsive means is shown in greater detail in FIG. 3, a stud portion 56 of the temperature sensing means 52 passes through an aperture in one of the pair of parallel standards 58 which extend outwardly from the disc 29. The stud portion 56 engages the end of shaft 53 distal the head 38 of pivotable member 36. The end of the shaft 53 juxtaposed the member 36 is attached to the member by a clip 60 which engages a complementary groove in the member and encircles an enlarged portion of the end of shaft 53. The head 38 has a bore 66 therein. A spring 68 is disposed within the bore and contacts the end of the bore 66 distal the point at which shaft 56 enters the bore and contacts one end of the shaft 53. This spring allows the wax filled power element to expand and force the shaft towards the pivotable member 36 as the temperature rises without mechanically rupturing the device. The spring will permit the shaft 53 to move after the pivoting member is engaged to a substantial degree. A spring 62 encircles the shaft 53 with one end nearest the temperature sensing means 52 pushing against an annular washer 64 and the other end pushing against the standard 58*b*. The spring 62 pushes the washer 64 which encircles the enlarged section of shaft 53 biasing the pivotable member 36 into an unengaged position when the temperature sensed is low and the temperature responsive drive means 50 causes engagement against the spring when the temperature rises.

FIG. 4 shows a slightly different configuration of a clutch of this invention. In this embodiment, a plastic engaging member 70 has been formed of a molded structural synthetic material having an aperture 72 cast directly therein. The aperture 72 is designed to slide over a modified fan carrier 74 which has a stud 76 formed thereon. The plastic engaging member 70 is pivotably retained on the stud 76.

Of course, various modifications of the temperature sensing means are possible to those skilled in the art. Examples would include bimetallic elements and other materials which change configuration with temperature.

Various modifications and alterations of this invention will become obvious to those skilled in the art without departing from the scope or spirit of this invention, and it is to be understood that this invention is not limited to the illustrative embodiments set forth hereinbefore.

For example the mechanical clutch of this invention could be used in other power transfer applications such as automotive air conditioner compressor drives.

What is claimed is:

1. A clutch adapted to be interposed between a driven shaft means and a load means, said clutch comprising:

a first clutch member adapted to be secured to one of said means for rotation therewith and defining a substantially V shaped first, arcuate, radially inwardly facing friction clutching surface;

a second clutch member adapted to be secured to the other of said means, and mounted for coaxial rotation relative to said first clutch member and including a portion defining a substantially V shaped second, arcuate, radially outwardly facing friction clutching surface complimentarily disposed radially inwardly of said first surface, the V shapes defined by said first and second friction clutching surfaces comprising legs which are converging in the radially outward direction; and means operative to rotatively mount one end of said portion at a point radially intermediate the axis of said shaft means and said first clutch member for pivotal movement between a first position in which said clutching surfaces are engaged and a second position in which said clutching surfaces are disengaged.

2. The clutch of claim 1, wherein said first member defines a housing having an interior at least partially enclosing said second member the first friction clutching surface being defined by a portion of the interior of said housing, said second clutch member being disposed within said housing and having a peripheral portion which is adapted to engage and disengage said first friction surface, said peripheral portion defining said second friction clutching surface.

3. The clutch of claim 1, further comprising temperature responsive means operative to selectively engage and disengage said clutch in response to temperature variations in the environment of said clutch.

4. The clutch of claim 3, wherein said first clutch member defines an annular clutching surface radially disposed about the shaft, said clutching surface having a cupped configuration; and said portion comprises a pivotable arm mounted on said second clutch member, said arm having a projecting portion defining said second, arcuate clutching surface which is shaped to engage the cupped configuration.

5. The clutch of claim 3, wherein said temperature responsive means has a power producing element including a liquid-solid phase change substance having a high coefficient of volumetric change during phase change, said volumetric change providing force to move said second friction clutching surface between engaged and disengaged positions.

6. The clutch of claim 3, wherein said second member has an engaging member located on the periphery thereof said engaging member having an arcuate shape and being pivotably mounted in an essentially counter balanced manner, said engaging member having one end in contact with said temperature responsive element said element moving said engaging member between said engaged and disengaged positions.

7. A temperature controlled clutch adapted to be interposed between a drive shaft and a load, said clutch comprising:

a housing member adapted to be mounted on said shaft, so that said housing member will rotate with said shaft and defining a substantially V shaped first, arcuate, radially inwardly facing friction clutching surface;

a carrier member adapted to be coaxially mounted on said shaft to rotate independently of said shaft and said housing member, said carrier member adapted for having said load mounted thereto;

a clutching element mounted on said carrier member and defining a complimentarily disposed, substantially V shaped second, arcuate, radially outwardly facing friction clutching surface, the V shapes defined by said first and second friction clutching surfaces comprising legs which are converging in the radially outward direction, one end of said clutching element being pivotally mounted at a point radially intermediate said shaft and said housing member, said clutching element being pivotally moveable between first and second positions, said clutching element being disengaged with said housing member in said second position and engaged with said housing member in said first position to clutchingly engage said carrier member to said housing member, causing them to rotate in unison; and a temperature responsive power means mounted on said carrier member, said power means being connected to said clutching element and adapted to move said clutching element between said first and said second positions.

8. A clutch adapted to be interposed between a driven shaft means and a load means, said clutch comprising:

a first clutch member adapted to be secured to one of said means for rotation therewith and defining a substantially V shaped first, arcuate, radially inwardly facing friction clutching surface;

a second clutch member adapted to be secured to the other of said means, and mounted for coaxial rotation relative to said first clutch member and including a portion defining a substantially V shaped second, arcuate, radially outwardly facing friction clutching surface complimentarily disposed radially inwardly of said first surface;

means operative to rotatively mount one end of said portion at a point radially intermediate the axis of said shaft means and said first clutch member for pivotal movement between a first position in which said clutching surfaces are engaged and a second position in which said clutching surfaces are disengaged; and temperature responsive means located within said second clutch member and including means associated therewith to direct air passing through said second clutch member across said temperature responsive means, said temperature responsive means being operative to selectively engage and disengage said clutch in response to temperature variations in the environment of said clutch.

9. The clutch of claim 8, wherein said temperature responsive means has a power producing element including a liquid-solid phase change substance having a high coefficient of volumetric change during phase change, said volumetric change providing force to move said second friction clutching surface between engaged and disengaged positions.

* * * * *